United States Patent [19]

Föhl

[11] Patent Number: 4,620,357
[45] Date of Patent: Nov. 4, 1986

[54] METHOD FOR ASSEMBLING A SAFETY BELT ROLL-UP DEVICE, ESPECIALLY FOR PROTECTING PERSONS IN MOTOR VEHICLES

[75] Inventor: Artur Föhl, Schorndorf, Fed. Rep. of Germany

[73] Assignee: TRW REPA Feinstanzwerk GmbH, Alfdorf, Fed. Rep. of Germany

[21] Appl. No.: 758,526

[22] Filed: Jul. 24, 1985

Related U.S. Application Data

[62] Division of Ser. No. 545,058, Oct. 25, 1983, Pat. No. 4,549,705.

[30] Foreign Application Priority Data

Oct. 26, 1982 [DE] Fed. Rep. of Germany ....... 3239584

[51] Int. Cl.[4] .......................................... B23P 11/00
[52] U.S. Cl. ...................................... 29/439; 29/428; 29/434; 29/DIG. 3
[58] Field of Search ................. 29/417, 428, 434, 439, 29/505, DIG. 3; 242/107, 107.4 R

[56] References Cited

U.S. PATENT DOCUMENTS

| | | | |
|---|---|---|---|
| 2,295,127 | 9/1942 | Pleister | 29/439 |
| 3,944,163 | 3/1976 | Hayashi et al. | 242/107.4 R |
| 4,010,524 | 3/1977 | Osamu et al. | 29/439 |
| 4,485,544 | 12/1984 | Van Ryswyk | 29/417 |

Primary Examiner—Howard N. Goldberg
Assistant Examiner—R. S. Wallace
Attorney, Agent, or Firm—Yount & Tarolli

[57] ABSTRACT

Safety belt roll-up device having a housing and a one-piece belt carrier. The housing has a base plate with two side walls extending from the base plate. At least one of the two side walls can be set at an angle and bent into a position in which both side walls are parallel. Each side wall has an opening through which a free end of the one-piece belt carrier extends. The one-piece belt carrier is in the form of a single piece including a belt shaft and a belt reel with a reel flange at each end of the belt reel. The belt reel has a diameter greater than the diameter of the opening in the side wall. The belt carrier is inserted between the side walls bent apart in V-shape. The belt carrier is held at the height of the openings and the ends walls moved together to a parallel position.

3 Claims, 5 Drawing Figures

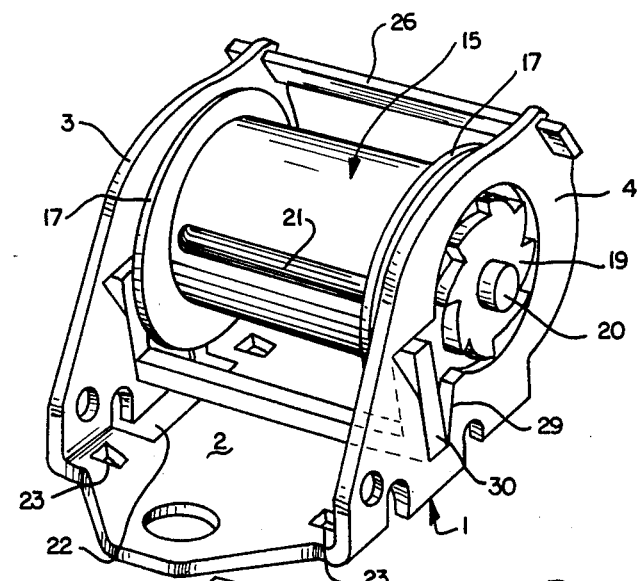
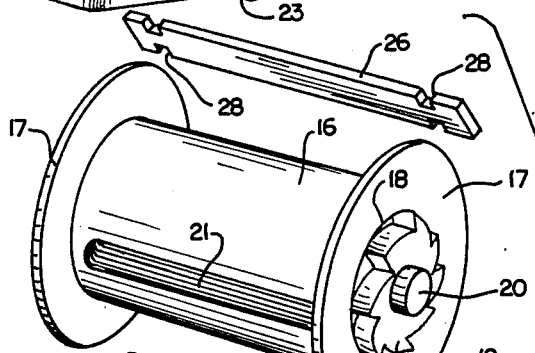
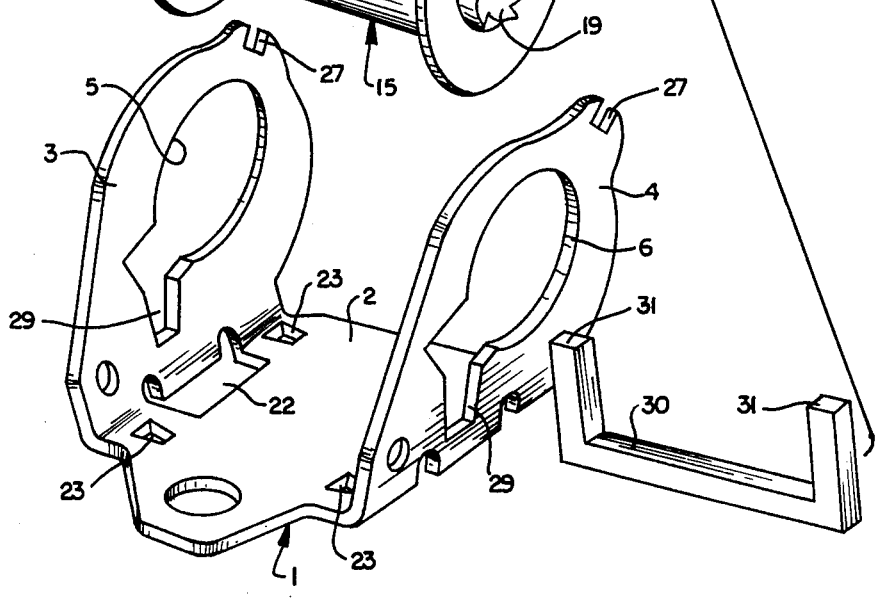
FIG.4
FIG.5

METHOD FOR ASSEMBLING A SAFETY BELT ROLL-UP DEVICE, ESPECIALLY FOR PROTECTING PERSONS IN MOTOR VEHICLES

This is a division of application Ser. No. 545,058, filed Oct. 25, 1983, now U.S. Pat. No. 4,549,705 issued Oct. 29, 1985.

BACKGROUND OF THE INVENTION

1. Field of the Invention

The invention relates to a safety belt roll-up device having a U-shaped housing, i.e. a base plate with two parallel end walls extending therefrom, and a belt shaft with its free ends extending through holes in the two end walls and to a method for manufacturing such a safety belt roll-up device.

2. Description of the Prior Art

A U-shaped roll-up device housing made of sheet steel is used in known safety belt roll-up devices of this type. The side walls of the housing support the belt shaft and the belt reel. For this purpose, relatively large openings are provided in the side walls through which the free ends of the belt shaft extend and are supported freely rotatably in resilient bearings, for instance, laterally to the side walls. Supported on the belt shaft, secured against rotation, between the side walls is a special belt reel consisting, for instance, of plastic material with lateral reel flanges, the diameter of which is larger than that of the above-mentioned openings or holes in the side walls. Locking discs which are, for instance, serrated on both side may be provided and likewise connected, secured against rotation, to the stable belt reel. The locking discs are located inside the holes and cooperate with a ratchet which releases automatically in case of danger such that the belt shaft and therefore, the belt reel is blocked immediately after the release. A flexible safety belt is wound on the belt reel. In assembling the safety belt roll-up device, the belt reel is first inserted between the mutually parallel side walls at the housing, whereupon the belt shaft is moved into its desired position axially through the holes and through a central hole in the belt reel. After the belt reel and the belt shaft are connected to each other secure against rotation, the belt reel of the belt shaft serves for axial security, i.e. prevents axial movement. As is customary, the belt shaft is connected with a rewinding spring on one side of the housing, while the release mechanism for the ratchet pawl is arranged on the other housing side. From the above it will be evident that the unit which carries and supports the safety belt requires two separately produced parts. Further the assembly of these parts, due to the necessity alone of feeding these parts, i.e., the belt shaft and the belt reel in different directions, is relatively complicated and expensive, and this does not include the parts or means which are required to connect the belt shaft and the belt reel to each other and make them secure against rotation relative to each other.

SUMMARY OF THE INVENTION

An object of the invention is to provide a safety belt roll-up device of the type mentioned in which the assembly effort is reduced and the manufacturing costs overall are decreased.

Also, the part of the roll-up device serving to support the safety belt is of simpler design with greater strength.

With the foregoing and other objects in view, there is provided in accordance with the invention a safety belt roll-up device adapted particularly for use in motor vehicles comprising a housing and a one-piece belt carrier, said housing having a base plate with two side walls extending from the base plate and having at least one of said two side walls which can be set at a diverging angle and bent into a position in which both side walls are parallel, an opening in each side wall through which a free end of the one-piece belt carrier extends, said one-piece belt carrier incorporating in a single piece a belt shaft and a belt reel with a reel flange at each end of the belt reel, said reel flange having a diameter greater than the diameter of said opening in the side wall.

In accordance with the invention, there is provided a method for the manufacture of a safety belt roll-up device comprising a housing and a one-piece belt carrier, said housing having a base plate with two side walls extending from the base plate, and an opening in each side wall through which a free end of the one-piece belt carrier extends, said one-piece belt carrier incorporating in a single piece a belt shaft and a belt reel with a reel flange at each end of the belt reel, said belt reel flange having a diameter greater than the diameter of said opening in the side wall, which comprises inserting the belt carrier between the side walls of the housing which are bent apart in V-shape to permit ready insertion of the belt carrier between the side walls, maintaining the belt carrier at the height of the openings, and moving the side walls together in a position parallel to each other causing the free ends of the belt carrier to extend through the openings in the side walls and the belt carrier to be retained within the side walls.

Other features which are considered as characteristic for the invention are set forth in the appended claims.

Although the invention is illustrated and described herein as embodied in a safety belt roll-up device, especially for protecting persons in motor vehicles, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

In FIG. 2 the side walls of the housing have a V-shape to permit ready insertion of the one-piece belt carrier between the two walls. In FIG. 3 the two end walls are shown moved to a position in which they are parallel to each other, FIG. 4 shows a perspective view of the safety belt roll-up device according to the invention, and FIG. 5 is an exploded view of the safety belt roll-up device according to the preceding figures.

DETAILED DESCRIPTION OF THE INVENTION

Figure 1:
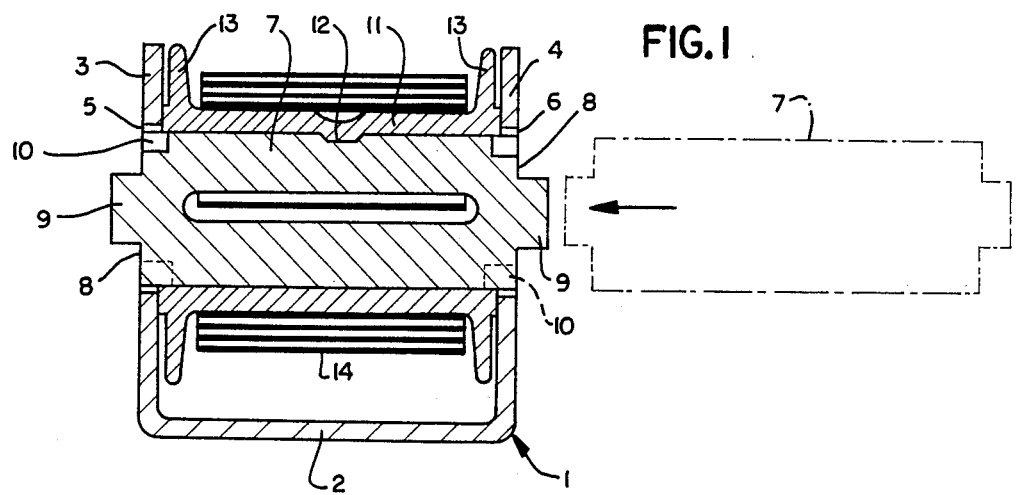
FIG. 1 shows a cross-sectional view of a conventional safety belt roll-up device.
Figure 2:
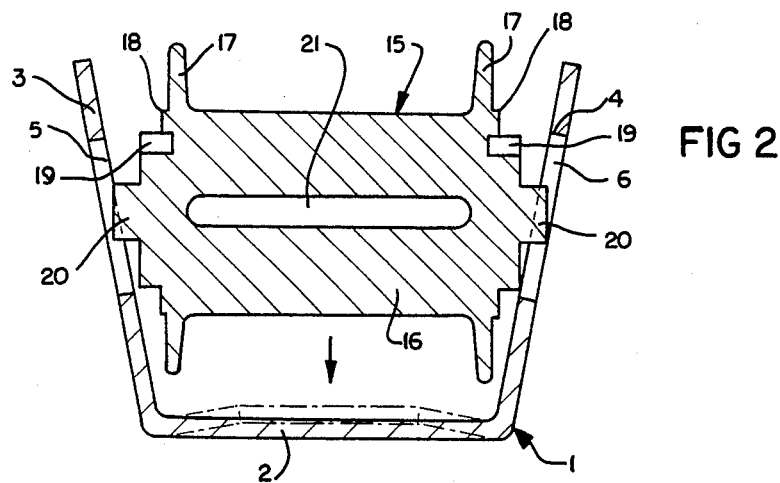
FIGS. 2 and 3 show cross-sectional views of the safety belt roll-up device according to the invention in two different phases of assembly.

According to the invention, the belt reel and belt shaft and, if applicable, also the blocking teeth with journal bearings consist of a single strong part in which connecting means for connecting the above-mentioned parts are not required. The assembly of this one-piece belt carrier becomes very simple, in that this belt support is inserted between the side walls which initially are spaced apart in V-fashion and then, these side walls are bent into the desired parallel position. These side walls may be additionally locked in the desired position by a spacer part which connects the two side walls to each other at the free ends and prevents them from diverging.

According to one advantageous embodiment of the invention, the axial length of the belt carrier corresponds substantially to the spacing of the outer boundary surfaces of the side walls. The end walls of the belt carrier can be immediately adjacent to ratchet teeth which then are located within the holes in the side walls and cooperate functionally, for instance, with a dual ratchet pawl. By designing the safety belt roll-up device in accordance with the invention, journal bearings may be formed directly at the belt carrier on both sides; the journals then extend beyond the side walls in the desired position. The assembly of the belt carrier provided with ratchet teeth is facilitated by the fact that in a safety belt roll-up device of the described design, the diameter of the holes in the side walls is larger than the outside diameter of the ratchet teeth, for instance, on both sides of the belt carrier. Although the axial length of the belt carrier is larger than the inside width between the side walls of the roll-up device housing, the belt carrier can be inserted radially between the side walls and into the holes without difficulty.

In a further embodiment of the invention, the housing has recesses in the region of the corners between at least one of the side walls and the base plate of the housing. This facilitates bending of the side walls to make them parallel to each other.

According to a method for manufacturing the safety belt roll-up device of the type described above, the belt carrier is inserted between the side walls of the belt carrier which are bent apart in V-fashion. The belt carrier is held at the height of the holes and held at that level until the side walls are set parallel to each other. A very simple procedure for setting the side walls parallel to each other is by straightening the concave base plate which connects the side walls to each other. As a result of straightening the concave base plate, the side walls which are initially bent outward in V-shape are simultaneously brought into the parallel position.

The invention will be explained in the following by means of an embodiment example shown in the drawings.

Only those parts of the known safety belt roll-up device and the safety belt roll-up device according to the invention are shown in the drawings which are essential for understanding the invention.

In the safety belt roll-up device according to FIG. 1, a U-shaped housing 1 having a base plate 2 and two mutually parallel side walls 3 and 4 which extend from the base plate 2 at right angles, is the supporting part of the roll-up device. The side walls 3 and 4 are provided with relatively large holes 5 and 6. A metallic belt shaft 7 has an axial length between the end corners 8 which corresponds to the spacing of the two outer boundary surfaces of the side walls 3 and 4. Bearing journals 9 follow the end corners 8. Ratchet teeth 10 are at the end corners 8. The outside diameter of the ratchet teeth 10 correspond substantially to the shaft diameter of the belt shaft 7. The belt shaft 7 is the carrier of a belt reel 11. The latter is a separate part and is connected, for instance, by connecting means 12 to the belt shaft 7 with the belt reel 11 secured against rotation relative to the shaft 7. Reel flanges 13, the diameter of which is larger than that of the holes 5 are on both sides of belt reel 11. A flexible safety belt 14 is wound on the belt reel 11. In the assembly of the safety belt roll-up device explained, the belt reel 11 is first inserted between the side walls 3 and 4 of the housing 1 up to the height of the holes 5 in the axial direction, whereupon the belt shaft 7, shown in FIG. 1 by dashed-dotted lines, is inserted axially in the direction of the arrow into the holes 5, and thereby into the central hole in the belt reel 11.

Figure 3:
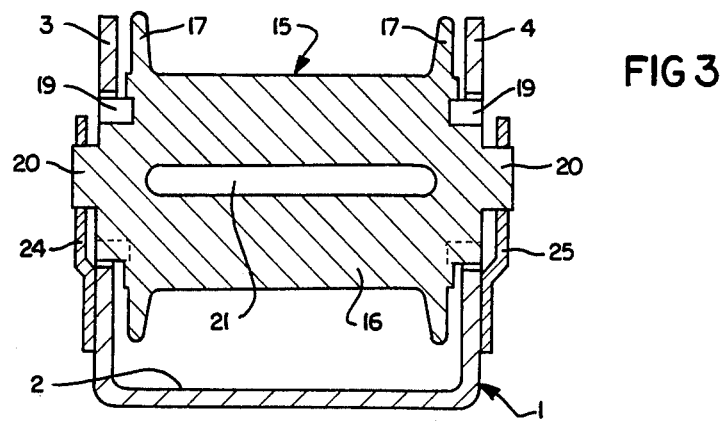

This complicated assembly is substantially facilitated in the safety belt roll-up device according to FIGS. 2 to 5, by designing the belt shaft 7 and the belt reel 11 of FIG. 1 as a one-piece belt carrier 15. This one-piece belt carrier 15 incorporates on both sides in a single piece of roll-up cylinder 16, reel flanges 17 and, adjacent thereto spacer extensions 18, ratchet teeth 19 as well as, with a tapered diameter, bearing journals 20. The diameter of the reel flanges 17 is substantially larger than the diameter of the holes 5 and 6 in the side walls 3 and 4, while the outside diameter of the ratchet teeth 19 is smaller than the interior of the holes 5 and 6. In the center of the belt carrier 15, is a slot 21 for locking the end of the belt. As shown in FIGS. 4 and 5, recesses 22 and 23 are provided in the region of the corners between the side walls 3 and 4 and the base plate 2 thereby weakening the bending cross section between the side walls and base plate. As shown particularly in FIG. 2, the side walls 3 and 4 are initially set apart in V-shape for the assembly, to permit the belt carrier 15 to be brought into the desired position. After positioning of the one-piece belt carrier 15, the set-apart side walls 3 and 4 are brought into the parallel position as shown in FIG. 3 by plastic deformation of the corner regions. This can be accomplished by pushing the originally convex base plate 2, indicated by the dashed-dotted lines in FIG. 2, in the direction of the arrow to straighten it (FIG. 3). As a result, the sidewalls 3 and 4 are moved automatically into the parallel position shown in FIG. 3. In this position, the ratchet teeth 19 are contained with play within the holes 5 and 6, with the bearing journals 20 extending beyond the outside surfaces of the sides 3 and 4. The belt carrier 15 is supported by means of bearing journals 20, freely and rotatably in bearing plates 24 and 25 which are attached to side walls 3 and 4. The two side walls 3 and 4 are connected to each other by a spacer 26, as can be seen from FIGS. 4 and 5. Spacer 26 is provided with slots 28 for insertion into slots 27 at the free ends of the side walls 3 and 4, and spacer 26 is locked by knurling or peening of the exposed edges of the slots 27. It may further be seen from FIGS. 4 and 5 that, in the side walls 3 and 4, adjacent to the holes 5 and 6, are bearing slots 29 in which a double ratchet pawl 30 with pawl extensions 31 is pivoted. This ratchet pawl 30 with its pawl extensions 31 can be moved by a release device, not shown, in the direction of the ratchet teeth 19 and comes into engagement with these ratchet teeth. The pawl extensions 31 of the pawl 30, as well as the ratchet teeth 19, are located within the side walls 3 and 4 of the housing 1.

The foregoing is a description, in substance, relating to German application No. P 32 39 584.1, dated Oct. 26, 1982, international priority of which is being claimed for the instant application, and which is hereby made part of this application. Any material discrepancies between the foregoing specification and the specification of the aforementioned corresponding German application are to be resolved in favor of the latter.

I claim:

1. Method for the manufacture of a safety belt roll-up device comprising a housing and an one-piece belt carrier, said housing having a base plate with two side walls extending from the base plate, and an opening in each side wall through which a free end of the one-piece belt carrier extends said one-piece belt carrier incorporating in a single piece a belt shaft and a belt reel with a reel flange at each end of the belt reel, said belt reel flange having a diameter greater than the diameter of said opening in the side wall, said method comprising the steps of inserting the one-piece belt carrier between the side walls of the housing which are bent apart in V-shape to permit ready insertion of the one-piece belt carrier between the side walls, maintaining the one-piece belt carrier at the height of the openings in the side wall, and moving the side walls together into a position parallel to each other to cause the free ends of the one-piece belt carrier to extend through the openings in the side walls and the one-piece belt carrier to be retained within the side walls.

2. Method according to claim 1, wherein the housing with the side walls bent apart in V-shape has a convex base plate, and wherein the step of moving the side walls together comprises the step of placing the side walls in the parallel position by straightening the convex base plate which connects the side walls.

3. Method according to claim 1 further comprising the step of connecting the two parallel side walls to each other at their free ends by a spacer to retain the side walls firmly in parallel position.

* * * * *